United States Patent
Daumueller et al.

[11] Patent Number: 5,975,723
[45] Date of Patent: Nov. 2, 1999

[54] LIGHT FOR VEHICLES WITH STEPPED LATERAL REFLECTOR REGION

[75] Inventors: Hans Daumueller, Bodelshausen; Heinz Ruckwied, Kusterdingen; Ursula Bristle, Oberboihingen, all of Germany

[73] Assignee: Robert Bosch GmbH, Stuttgart, Germany

[21] Appl. No.: 08/869,233

[22] Filed: Jun. 4, 1997

[30] Foreign Application Priority Data

Jun. 18, 1996 [DE] Germany ............... 1 96 24 244

[51] Int. Cl.$^6$ .................................................. F21V 7/00
[52] U.S. Cl. .................... 362/297; 362/517; 362/518; 362/519; 362/520
[58] Field of Search ..................... 362/517, 519, 362/520, 297, 518

[56] References Cited

U.S. PATENT DOCUMENTS 3,700,883 10/1972 Donohue et al. .................. 362/518
3,809,880 5/1974 Daumueller et al. .............. 240/8.2
5,525,856 6/1996 Kawai et al. ...................... 313/114

FOREIGN PATENT DOCUMENTS

3239754C2  1/1991  Germany.

Primary Examiner—Nimeshkumar D. Patel
Assistant Examiner—John A. Ward
Attorney, Agent, or Firm—Michael J. Striker

[57] ABSTRACT

A light for a vehicle has a reflector, a light source, a light-permeable disk covering a light outlet opening, the reflector having a central region which surrounds the light source and a lateral region, the central region of the reflector having a lateral opening through which a light emitted by the light source can reach the lateral reflector region, the lateral reflector region having at least in one zone a plurality of stepped reflection profiles, the lateral reflector region having an upper edge and a lower edge, at least one reflection segment arranged near one of the edges so that a light emitted from the light source impinges on the reflection segment through the opening of the central reflection region, the reflection segment having a greater extension than the reflection profile at least in a horizontal direction.

12 Claims, 2 Drawing Sheets

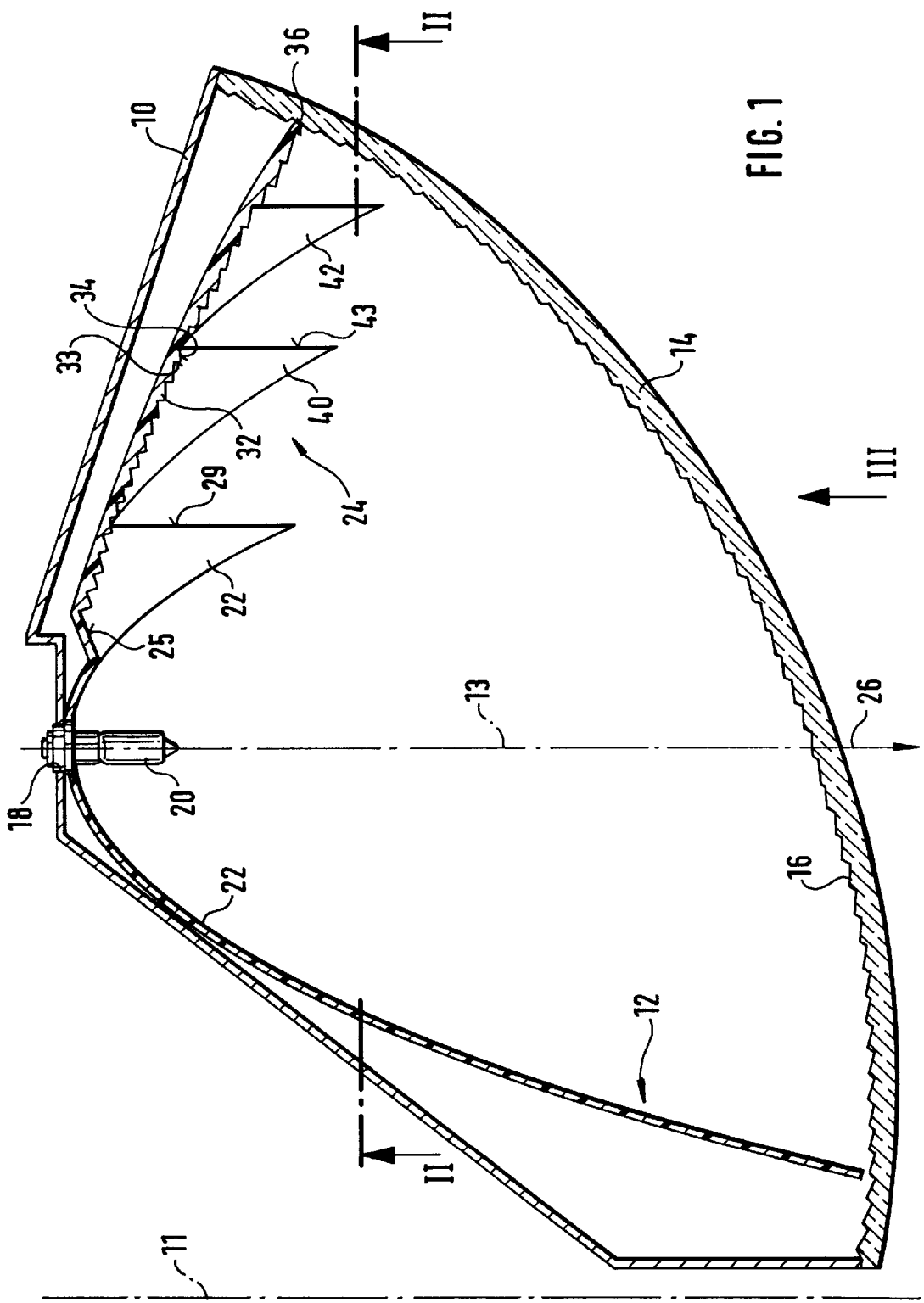

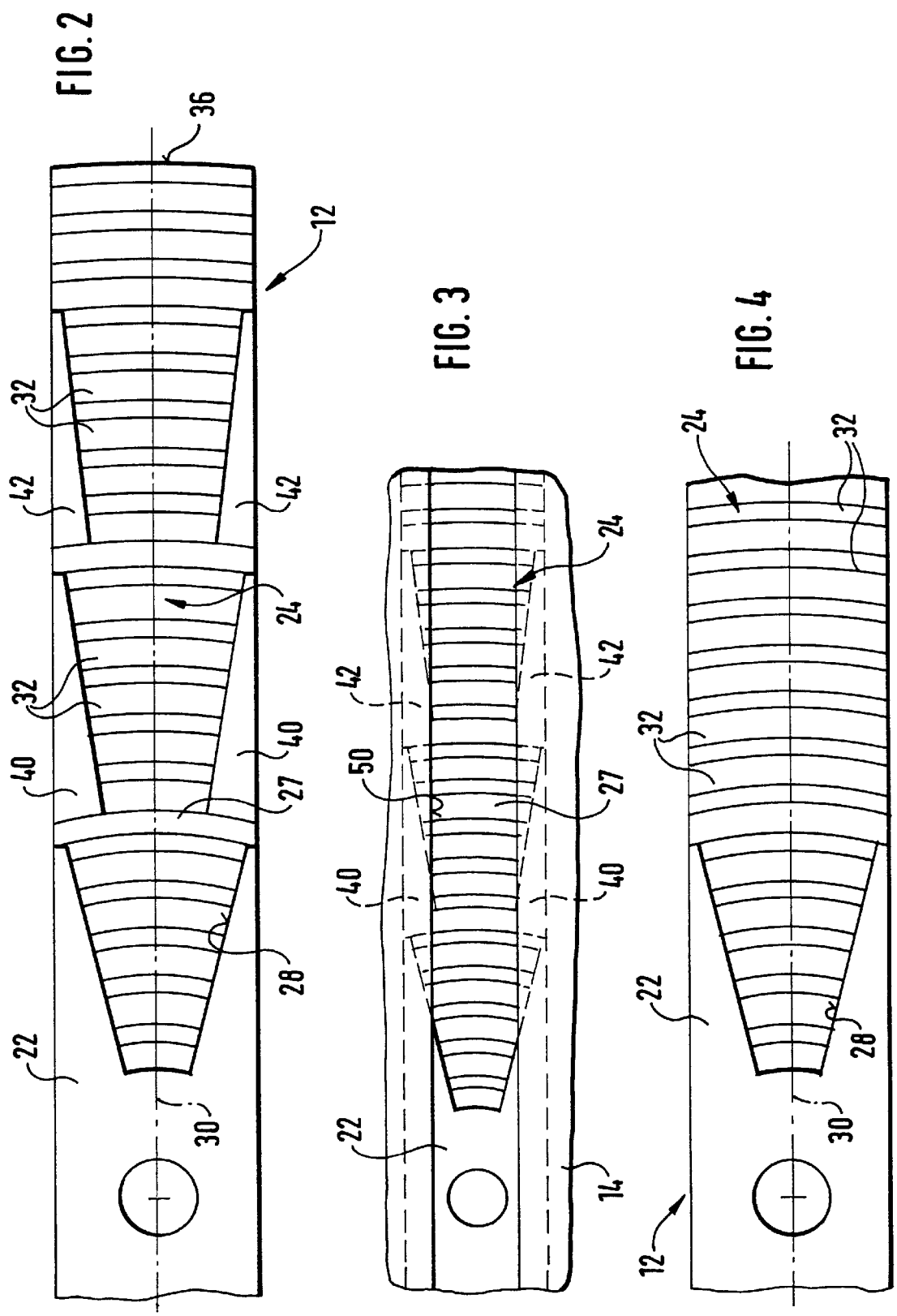

LIGHT FOR VEHICLES WITH STEPPED LATERAL REFLECTOR REGION

BACKGROUND OF THE INVENTION

The present invention relates to a light for vehicles.

One of such lights is disclosed for example in the German patent document DE 32 39 754 C2. This light has a reflector, a light source and a light-permeable disk which covers the light outlet opening. The reflector has a central region which surrounds the light source and a lateral region. The central region of the reflector has a lateral recess, through which the light emitted by the light source can reach the lateral region of the reflector. The central region of the reflector is formed by two parts in form of parabeloid portions, through which the light emitted by the light source is reflected substantially parallel to the optical axis. The lateral region of the reflector is provided with a plurality of step wedge-shape reflection profiles, by which the light emitted from the light source is reflected. Thereby the light eliminates over its whole width, but the illumination of the lateral region of the reflector and thereby of the light is weaker than in the central region, since the light reflected only from the surfaces of the reflection profile which face the light source, while the surfaces of the reflection profile which away the light source does not receive any light and they are seen as dark. Moreover, a clear weakening of the illumination at the transition between the central and the lateral region of the reflector is visible.

SUMMARY OF THE INVENTION

Accordingly, it is an object of the present invention to provide a light for vehicle, which avoids the disadvantages of the prior art.

In keeping with these objects and with others which will become apparent hereinafter, one feature of the present invention resides, briefly stated, in a light for a vehicle, in which at lateral reflector regions near its upper and/or lower edge at least one reflection segment is arranged on which the light emitted from the light source through an opening of the central reflector region impinges, and it has a greater extension at least in a horizontal direction relative to an individual reflection profile.

When the light for vehicle is designed in accordance with the present invention, it has the advantage that the weakening of the illumination at the transition from the central to the lateral reflector region is less visible. At least one reflection segment provides a stronger illumination of the lateral region of the reflector.

In accordance with a further feature of present invention, the opening of the central region of the reflector expands toward the lateral reflection region. Because of this, the reflection surface of the central reflector region is reduced by the expanding opening, and thereby the illumination from the central reflection region is reduced.

In accordance with another feature of the present invention, the opening of the central reflector region expands toward the lateral reflector region, in particular in V-shaped manner. This provides a weakening of the illumination at the transition between the central and the lateral regions of the reflector.

In accordance with a further feature of the present invention, at the lateral reflector region, several reflection segments are arranged facing away from the central reflector region, each reflector segment reduces from the central reflector region so that the light emitted by the light source passes over it and can impinge on the corresponding subsequent reflection segment. With this construction, a further improvement of the illumination by the lateral reflector region is provided.

In accordance with the further feature of the present invention, the at least one reflection segment is arranged turned so that the light reflected from it exits through the light outlet opening. Therefore, the light reflected from the upper and/or lower edge of the lateral region of the reflector arranged outside the light outlet opening can be used.

In accordance with a further feature of the present invention, the reflector segments is reduced to the upper or lower edge of the lateral reflector region, in particular in a V-shaped manner. Therefore, a further increase of the illumination of the lateral region of the reflector is provided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a light in accordance with the first embodiment of the present invention in a horizontal longitudinal section;

FIG. 2 is a view showing a section taken along the lines II—II in FIG. 1;

FIG. 3 is a view showing a section of the light as seen in direction of the arrow 3 in FIG. 3; and FIG. 4 is a view showing a section taken along the line II—II in FIG. 1 in accordance with a second embodiment.

DESCRIPTION OF PREFERRED EMBODIMENTS

A light for a vehicle, in particular a motor vehicle shown in FIGS. 1–4 can be used for example as a front or a rear blinking light. The light can be arranged near a headlight or can be arranged in a joint housing with a headlight. The light has a housing 10 with a reflector 12 arranged in the housing and with a light outlet opening covered by a light-permeable cover member 14 formed for example as a disk. The disk 14 can be composed of glass or synthetic plastic material, it can be colorless or can be colored in a single color which is required for the light. The disk 14 can be smooth from outside or can be provided on its inner side facing the reflector 12 with optical elements for deviating the passing light, in particular for dispersing the passing light.

A light source 20 is arranged in the reflector 12 in an opening 18, coaxially to an optical axis 13 of the reflector 12. The reflector 12 has a central region 22 which surrounds the light source 20, and a lateral region 24. The light is arranged on the vehicle preferably so that the central reflector region 22 is oriented toward the longitudinal central plane 11 of the vehicle, while the lateral reflector region 24 is oriented to the outer side of the vehicle. The light corresponds to the outer contour of the vehicle. Its lateral edge region arranged on the outer side of the vehicle is offset relative to the inner edge region and is oriented to the longitudinal central plane 11 of the vehicle, opposite to the light outlet direction 26. The disk 14 extends between the inner edge region and the lateral edge region of the light in a curved manner. The light has a substantially greater width than a height.

The central reflector region 22 has a concavely curved reflection surface, which for example can be formed at least approximately by a part of a parabaloid. The light emitted by the light source 20 can be reflected from the central reflector region 22 at least approximately parallel to the optical axis 13. The reflection surface of the central reflector region 22 can have any shape. The light emitted by the light source 20 can be reflected from it so that after passage through the disk 14 and in some cases deviation by the optical elements 16 it produces a predetermined illumination intensity distribution. The central reflector region 22 extends to the longitudinal central plane 11 of the vehicle in the light outlet direction 26 to the disk 14. The central reflector region 22 extends to the outer side of the vehicle only over a part of the width of the light, and the lateral reflector region 24 follows it and extends to the disk 14 at the lateral edge region of the light.

The central reflector region 22 has an opening 28 at the lateral reflector region 24. The light emitted by the light source 20 passes through the opening 28 and can impinge on the lateral reflector region 24. The opening 28 is arranged preferably symmetrically above and below a horizontal plane 30 which includes the optical axis 13. The opening 24 is formed so that it expands to the lateral reflector region 24. In particular, the opening expands substantially approximately V-shaped and is arranged at least approximately symmetrically to the horizontal plane 30. At the transition from the central reflector region 22 to the lateral reflector region 24, a step 26 is provided in the recess 28 and oriented opposite to the light outlet direction 26. In its parts remaining outside the recess 28, the central reflector region 22 expands with its reflection surface to the lateral reflector region 24. At the end of the central reflector region 22, a step 29 is provided at the transition to the lateral reflector region 24 and oriented opposite to the light outlet direction 26.

The lateral reflector region 24 has a plurality of stepped wedge-shaped reflection profiles 32 in a central zone 27 which is located above and below at the horizontal plane 30. The reflection profile 32 face toward the lateral outer edge 36 of the reflector 12 and are arranged one after the other. The base shape of the central zone 27 of the lateral reflector region 24 as considered in horizontal sections can be straight or concavely curved, for example spherically or parabolically. When considered in vertical longitudinal sections, the lateral reflector region 24 in its central zone 27 can be straight or concavely curved. The reflection profiles 32 project from the base shape of the lateral reflector region 24 in a wedge-shaped manner in the light outlet direction 26. They have a surface 33 facing the light source 20 and a surface 34 facing away from the light source. No light emitted by the light source 20 impinges on the surfaces 34 which face away from the light source 20. The height of the reflection profiles in the light outlet direction 26 is such that the light emitted by the light source 20 can impinge on the surface 33 of the subsequent reflection profile 32. The reflection profiles 32 as considered in direction of the optical axis 13 can extend substantially vertically and straight or can extend along a curved line, for example over a radius with a center point on the optical axis 13. The surfaces 33 of the reflection profile 32 can be formed substantially flat or concavely or convexly curved. In particular, the surfaces 33 of the reflection profile 32 can be formed at least approximately by parts of parabeloids. The light emitted by the light source 20 is reflected by the surfaces 33 of the reflection profile 32 so that in extends at least approximately parallel to the optical axis 13.

In the first embodiment of the light shown in FIGS. 1–3, the lateral reflection region 24 has at its upper and lower edge region a reflection segment 40. A reflection has a greater extension in the horizontal direction than the step wedge-shape reflection profiles 32, or in other words a greater width. It extends farther in the light outlet direction 26 than the reflection profiles 32. The light emitted by the light source 20 impinges which passes through the opening 28 impinges on the reflection segments 40. The reflection segments 40 can have a reflection surface which at least approximately forms a part of a parabeloid. By the reflection segment 40 the light emitted by the light source is reflected at least approximately parallel to the optical axis 13. Alternatively, the reflection segment 40 can have another shaped reflection surface which is formed so that the light emitted by the light source 20 is reflected in a predetermined direction.

Preferably, several reflection segments located one behind the other are provided on the later reflection region 24 in the horizontal direction. A further reflector segment 32 is arranged in correspondence with each of the reflector segments 40. The reflection segments 40 are preferably formed so that they narrow away from the central reflector region 22, in particular toward the upper or lower edge of the lateral reflector region 24. The reflection segment 40 can be at least approximately V-shaped and reducing. With this shape of the reflection segment 40 a maximum part of the light emitted by the light source can impinge on the corresponding subsequent reflection segment 40. At the transition between the reflection segment 40 and the further reflection segment 42, a step 43 facing opposite to the light outlet direction 26 is provided. The reflection segment 42 can each have a reflection surface which is formed also at least approximately by a part of a parabeloid. Therefore, the light emitted by the light source 20 is reflected from it approximately parallel to the optical axis 13. The further reflection segment 42 can have another shape reflection surface, so that the light emitted by the light source is reflected in a predetermined direction. The further reflection segments 42 can be also formed so that they narrow away from the central reflector region 22, and one or several further reflection segments can be arranged after it away from the central reflector region 22.

Since the light emitted by the light source is reflected from the reflection profile only by their surfaces 33, a relatively weak illumination is provided from the central zone 27 of the lateral reflector region 24. The reflection segment 40, 42 have a greater services when the surfaces 33 of the reflection profiles 32, and therefore can substantially increase the illumination provided by the lateral reflector region 24. In deviation from the above described embodiment, it is also possible to provide at least one reflection segment 40 or 40 and 42 on the lower edge or only on the upper edge of the lateral reflector region 22. In this case, the zone 27 with the stepped, wedge-shape reflection profile 32 extends over the remaining part of the lateral reflector region 24.

The extension of the light outlet opening 50 of the light can be also provided in a vertical direction, in other words in its height, smaller than the extension of the reflector 12 in the vertical direction, or in other words, its height. In the shown embodiment, the light outlet opening 50 extends as shown in FIG. 3 only in the central region of the reflector 12. In other words, only a central zone of the reflector 12 is covered at both sides from the horizontal plane 30 with the light outlet opening 50, while the upper and the lower edge of the reflector 12 are offset to the light outlet opening 50. Preferably, the central zone 27 coincides with the light outlet opening 50. Therefore, the reflection segment 40, 42 and the upper and lower edge of the central reflector region 22 are arranged outside the light outlet opening 50. In this case, the reflection segment 40 and the further reflection segment 42 are turned around an axis extending in the horizontal plane 30 so that the light reflected by them can exit only through the light outlet opening 50. The reflection segment 40, 42 arranged on the upper edge of the lateral reflector region 24 are turned correspondingly downwardly, and the reflector segments 40, 42 arranged on the lower edge are turned correspondingly upwardly. In addition, the upper and lower edge of the central reflector region 22 which is not covered with the light outlet opening 50 can be turned around the axis extending in the horizontal plane 30 so that the light reflected from it exits through the light outlet opening 50.

Alternatively to the above described embodiment, only the upper edge or only the lower edge of the reflector 12 can be offset toward the outlet opening 50. Then only the reflector segment 40, 42 arranged on the upper or the lower edge of the lateral reflector region, or only the upper or the lower edge of the central reflector region 22 which are turned can be utilized.

In the second embodiment shown in FIG. 4 the light has a reflector 12 which has a central region 22 formed substantially as in the first embodiment. A lateral reflector region 24 follows the central region 22 and has a plurality of step, wedge-shape reflection profile 32 which are oriented toward the lateral outer edge of the reflector 12 and follow one another and which substantially corresponds to the first embodiment. The reflection profile 32 extend, in deviation from the first embodiment, over the total height of the lateral reflector region 24. The central reflector region 24 has an opening 28 extending to the lateral reflector region 24 and extending to the lateral reflector region 24. The opening 28 can extend at least approximately V-shaped and can be arranged at least approximately symmetrically to the horizontal plane 30. Due to the expanded shape of the opening 28, the surface of the central reflector region 22 reduces to the lateral reflector region 24. Therefore, the light that is less reflected through by the central reflector region 22 correspondingly, and the transition to the weaker illumination provided by the light reflector region 24 can be less visible.

It will be understood that each of the elements described above, or two or more together, may also find a useful application in other types of constructions differing from the types described above.

While the invention has been illustrated and described as embodied in light for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A light for a vehicle, comprising a reflector; a light source; a light-permeable disk covering a light outlet opening, said reflector having a central reflector region which surrounds said light source and a lateral reflector region, said central region of said reflector having a lateral opening through which a light emitted by said light source can reach said lateral reflector region, said lateral reflector region having at least in one zone a plurality of stepped reflection profiles, said lateral reflector region having an upper edge and a lower edge; at least one reflection segment arranged near one of said edges so that a light emitted from said light source impinges on said reflection segment through said opening of said central reflection region, said reflection segment having a greater extension that said reflection profile at least in a horizontal direction.

2. A light for a vehicle as defined in claim 1, wherein said opening of said central reflector region expands toward said lateral reflector region.

3. A light for a vehicle as defined in claim 2, wherein said opening of said central reflector region is at least approximately V-shaped.

4. A light for a vehicle as defined in claim 1; and further comprising a plurality of such reflection segments arranged at said reflector region and oriented away from central reflector regions, each of said reflector segments reducing toward said central reflector region so that a light emitted by said light source passes over said reflection segment and is impingeable on a subsequent one of said reflection segments.

5. A light for a vehicle as defined in claim 4, wherein said reflection segments narrow relative toward one of said edges of said lateral reflector region.

6. A light for a vehicle as defined in claim 1, wherein said at least one reflection segment is V-shaped.

7. A light for a vehicle as defined in claim 1, wherein said at least one reflection segment has a reflection surface which at least approximately forms a part of a palabeloid.

8. A light for a vehicle as defined in claim 1, wherein said reflector covers said light outlet opening in a vertical direction only partially, said at least one reflection segment being arranged in an edge region of said lateral reflector region which is not covered by said light outlet opening.

9. A light for a vehicle as defined in claim 8, wherein said at least one reflection region is turned so that a light reflected by said at least one reflection region passes through said light outlet opening.

10. A light for a vehicle as defined in claim 8, wherein said central reflection region has an edge which is not covered said light outlet opening and is turned so that a light reflected by said edge of said central reflector region passes through said light outlet opening.

11. A light for a vehicle, comprising a reflector; a light source; a light-permeable disk covering a light outlet opening, said reflector having a central reflector region which surrounds said light source and a lateral reflector region, said central reflector region having a lateral opening through which a light emitted by said light source can reach said lateral reflector region, said lateral reflector region at least in one zone having a plurality of stepped reflection profiles, said opening extending toward said lateral reflector region and being at least approximately V-shaped.

12. A light for a vehicle as defined in claim 11, wherein said opening is at least approximately symmetrical to a horizontal central plane of said reflector.

* * * * *